(12) United States Patent
Gupta et al.

(10) Patent No.: US 11,904,457 B2
(45) Date of Patent: Feb. 20, 2024

(54) COMPLIANT GRIPPER

(71) Applicant: Evodyne Robotics Corporation, Mountain View, CA (US)

(72) Inventors: Raghav Gupta, Saratoga, CA (US); Brandon Kane Tarter, San Jose, CA (US); Austin Edward Kerby, Los Gatos, CA (US); Rajath Swaroop Mulky, San Jose, CA (US); Brian Lim, Union City, CA (US)

(73) Assignee: Evodyne Robotics Corporation, Mountain View, CA (US)

( * ) Notice: Subject to any disclaimer, the term of this patent is extended or adjusted under 35 U.S.C. 154(b) by 488 days.

(21) Appl. No.: 17/128,768

(22) Filed: Dec. 21, 2020

(65) Prior Publication Data

US 2021/0197399 A1 Jul. 1, 2021

Related U.S. Application Data

(60) Provisional application No. 62/972,845, filed on Feb. 11, 2020, provisional application No. 62/957,743, filed on Jan. 6, 2020, provisional application No. 62/954,196, filed on Dec. 27, 2019, provisional application No. 62/954,173, filed on Dec. 27, 2019, provisional application No. 62/954,252, filed on Dec. 27, 2019.

(51) Int. Cl.
| | |
|---|---|
| *B25J 15/00* | (2006.01) |
| *B25J 15/12* | (2006.01) |
| *B25J 15/02* | (2006.01) |
| *B25J 19/02* | (2006.01) |

(52) U.S. Cl.
CPC ....... *B25J 15/0009* (2013.01); *B25J 15/0233* (2013.01); *B25J 15/12* (2013.01); *B25J 19/02* (2013.01)

(58) Field of Classification Search
CPC .... B25J 15/0009; B25J 15/0233; B25J 15/12; B25J 19/02; B25J 9/104
See application file for complete search history.

(56) References Cited

U.S. PATENT DOCUMENTS

| | | | | |
|---|---|---|---|---|
| 5,447,403 | A * | 9/1995 | Engler, Jr. ........... | B25J 15/0009 294/111 |
| 6,817,641 | B1 * | 11/2004 | Singleton, Jr. ........... | B25J 9/102 901/29 |
| 7,168,748 | B2 * | 1/2007 | Townsend ............ | C25D 11/005 901/46 |
| 8,231,158 | B2 * | 7/2012 | Dollar ...................... | B25J 15/12 294/111 |
| 9,832,980 | B2 * | 12/2017 | Kovarik ..................... | B25J 1/02 |
| 2005/0121929 | A1 * | 6/2005 | Greenhill ............... | B25J 9/1075 294/106 |

(Continued)

*Primary Examiner* — Stephen A Vu

(74) *Attorney, Agent, or Firm* — Daylight Law, P.C.

(57) ABSTRACT

Grippers, such as robotic grippers, and associated methods and systems are disclosed herein. One disclosed gripper includes a first compliant gripper jaw, a first push-pull assembly having a first distal end fixed on the first compliant gripper jaw, a second compliant gripper jaw, a second push-pull assembly having a second distal end fixed on the second compliant gripper jaw, and an actuator connected to both the first push-pull assembly and the second push-pull assembly.

11 Claims, 6 Drawing Sheets

(56) References Cited

U.S. PATENT DOCUMENTS

| | | | | |
|---|---|---|---|---|
| 2005/0218679 A1* | 10/2005 | Yokoyama | ............... | B25J 9/142 |
| | | | | 294/99.1 |
| 2010/0259057 A1* | 10/2010 | Madhani | ................ | B25J 9/1045 |
| | | | | 901/31 |
| 2016/0136820 A1* | 5/2016 | Lessing | .................... | B25J 15/12 |
| | | | | 294/208 |

* cited by examiner

COMPLIANT GRIPPER

CROSS REFERENCE TO RELATED APPLICATIONS

This application claims the benefit of U.S. Provisional Patent Application No. 62/954,173, filed Dec. 27, 2019, U.S. Provisional Patent Application No. 62/957,743, filed Jan. 6, 2020, U.S. Provisional Patent Application No. 62/972,845, filed on Feb. 11, 2020, U.S. Provisional Patent Application No. 62/954,252 filed Dec. 27, 2019, U.S. Provisional Patent Application No. 62/954,196, filed Dec. 27, 2019, all of which are incorporated by reference herein in their entirety for all purposes.

BACKGROUND

The ability to grip an object is a foundational skill for manipulating an environment. Grippers are a broad category of devices that can execute a gripping action. Grippers can be attached to robotic systems to allow them to manipulate their environments autonomously, attached to a robotic platform but guided by human operators to increase the functionality of the platform, or attached to manually operated tools or prosthetics to assist people that are otherwise unable to execute a specific gripping action. When attached to a robotic arm, grippers are referred to as robotic end effectors.

The design of a robotic gripper will depend on the environment in which the gripper is designed to function and the type of objects the gripper will be expected to grip. Robotic grippers can be custom designed for specific applications in which the application itself has also been designed to operate with the gripper. These applications can fall within the broad category of "structured environments" in which an environment has been formed specifically for interaction with a robot. The quintessential structured environment for robots is the assembly line in which a gripper can be highly specialized and designed exclusively to grip a given component to be added to the current work piece of the assembly line. Robotic grippers can alternatively be designed for general purpose gripping in semi-structured or unstructured environments in which an environment has not been purposefully designed for robotic interaction. In the context of unstructured or semi-structured environments, the design constraints placed on the gripper can be far more complex as the gripper cannot be pre-designed to interact with an object from a given angle or at a given location. Furthermore, in certain applications, a gripper must be designed to grip items with highly variant characteristics (e.g., heavy, light, big, small, soft, hard, smooth, irregular) placing further constraints on the design. General purpose grippers for unstructured environments represent a challenging design problem. However, as robots are integrated further and further into daily life, the importance of general-purpose grippers will continue to rise.

SUMMARY

This disclosure relates to grippers generally and specifically to a compliant gripper. The gripper can be integrated on an autonomous robotic platform, attached to a manual tool, attached to a prosthetic, or used in any situation in which gripping an item is required. In specific embodiments of the invention, the compliant gripper is a general-purpose gripper designed to operate in unstructured or semi-structured environments. In still further specific embodiments of the invention, the compliant gripper forms part of a robotic platform designed to operate as a personal assistant for a hospitalized or immobile individual, a personal assistant for a disabled person, or a personal assistant for daily home use. The gripper may be able to securely grip both hard and soft items without dropping them or placing unnecessary strain on the item.

In specific embodiments of the invention, the gripper includes a first compliant gripper jaw and a second compliant gripper jaw. The gripper jaws can be compliant in order to maximize contact on the grip target with a high friction surface of the gripper. The compliant gripper can be designed to delicately place a gripping surface in conformance with the grip target thereby maximizing contact with a high friction surface of the gripper. As used herein, the term jaw includes any prehensile element, including any movable element that can create a friction or pressure grip with an item to be held, and including robotic fingers. As used herein, the term compliant refers to the tendency of a structure to undergo elastic deformation when subjected to an applied force (i.e., the reciprocal of stiffness). In specific embodiments of the invention, the gripper can include two push-pull assemblies that cause the gripper to open and close. The push-pull assemblies can be connected to an actuator such that they can be pushed when it is time for the gripper to shut and pulled back when it is time for the gripper to open. Using a push-pull assembly with a compliant gripper jaw causes the gripper jaw to conform to the contours of the object and creates a strong gripping action without applying unnecessary force to the item to be lifted. As a result, objects having varying degrees of structural integrity can be safely gripped and manipulated. The resulting gripper can be beneficially applied as a general-purpose gripper in unstructured environments.

In specific embodiments of the invention, the gripper does not include any sensors that govern the degree by which the gripper jaws are actuated, or the amount of pressure applied by the gripper jaws upon the item to be lifted. This aspect of specific embodiments of the invention is beneficial in that it decreases the cost and complexity of the gripper design while at the same time decreasing the complexity of any associated control system used to position and actuate the gripper and increasing the expected durability of the design. In specific embodiments of the invention, the gripper utilizes at least one compliant gripper jaw which is actuated via a push-pull assembly that is maximally pushed and maximally pulled in each gripping action regardless of the item being gripped. As opposed to sensing the degree by which the gripper jaw should be actuated, the compliant nature of the gripper jaw and the push-pull action of the gripper customizes the gripping action and renders the gripper general-purpose. In the embodiments mentioned in this paragraph, the gripper can be augmented with a sensor to align the gripper relative to the item to be gripped, but the gripping action itself is controlled fully independently of the sensing system. In other words, the control loop which controls the force of the grip does not include any sensor data.

In specific embodiments of the invention, a gripper is provided. The gripper includes a first compliant gripper jaw, a first push-pull assembly having a first distal end fixed on the first compliant gripper jaw, a second compliant gripper jaw, and a second push-pull assembly having a second distal end fixed on the second compliant gripper jaw. The gripper also includes an actuator connected to both the first push-pull assembly and the second push-pull assembly.

In specific embodiments of the invention, a gripper is provided. The gripper includes a first compliant gripper jaw and a first wire having a first distal end on the first compliant gripper jaw. The gripper also includes a second gripper jaw and a second wire having a second distal end on the second compliant gripper jaw. The gripper also includes an actuator configured to actuate the gripper by pushing and pulling the first wire and the second wire.

DETAILED DESCRIPTION

Systems and methods involving compliant grippers in accordance with the summary above are disclosed below. The specific embodiments of these systems and methods disclosed in this section are provided for explanatory purposes and are not meant to limit the invention, the scope of which is provided by the appended claims.

Figure 1:
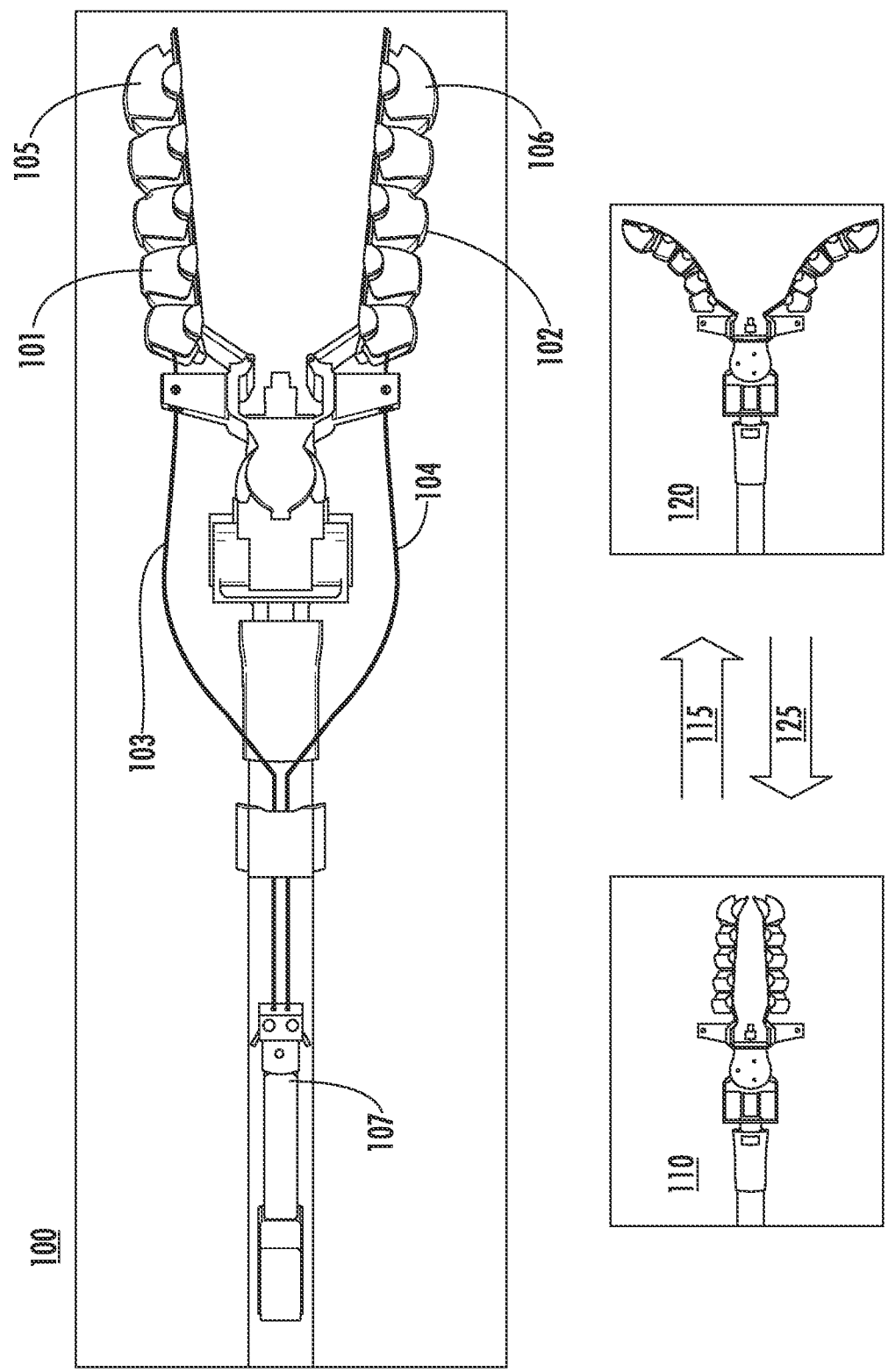
FIG. 1 includes a rendering of a gripper with two compliant gripper jaws and exposed push-pull assemblies in accordance with specific embodiments of the invention.

FIG. 1 includes a rendering 100 of a gripper with two compliant gripper jaws and exposed push-pull assemblies in accordance with specific embodiments of the invention. The gripper includes first and second compliant gripper jaws 101 and 102 and first and second push-pull assemblies 103 and 104. The push-pull assemblies in the illustrated case are stiff metal wires, in the form of bicycle brake wires, which are threaded through holes in the components that make up the compliant gripper jaws. The push-pull assemblies have distal ends fixed within the terminating components of gripper jaws 105 and 106.

FIG. 1 also illustrates the gripper jaws moving from a closed state 110 to an open state 120. The action 115 of the gripper jaws moving from the closed state 110 to the open state 120 and the action 125 of the gripper jaws moving from the open state 120 back to the closed state 110 involve a single linear actuator. As shown in rendering 100, the push-pull assemblies 103 and 104 are both threaded back through the arm connected to the gripper and are attached to a single linear actuator 107. As the linear actuator 107 moves towards the gripper, the gripper conducts action 125 and the push-pull assemblies push the distal ends of the gripper jaws together. During this action, the gripper jaws conform around the item to be gripped as illustrated below. As the linear actuator 107 moves away from the gripper, the gripper conducts action 115 and the push-pull assemblies pull the gripper jaws apart to release the gripped item.

While FIG. 1 is in accordance with specific embodiments of the invention disclosed herein, various modifications can be made to the illustrated gripper in keeping with alternative embodiments. For example, the gripper may include a single actuating compliant gripper jaw, similar to gripper jaws 101 and 102, and a stiff static gripper jaw against which gripping force is applied by the opposing compliant actuating jaw. As another example, the gripper may or may not include an aperture between the gripper jaws as illustrated in closed state 110 as the gripper jaws may be in contact along the length of the grip in the closed state. Numerous additional variations are described herein.

In specific embodiments of the invention, the gripper will include a push-pull assembly in at least one gripper jaw. For example, the gripper could include a stiff wire 104 threaded through a gripper jaw and have a distal end fixed at the end of the gripper jaw. A stiff wire such as bicycle brake wire can be used because it is rigid and strong and because it is flexible over the length of the wire. The push-pull assembly can also be on the outside of the gripper jaw and does not necessarily need to be threaded through any of the gripper jaw components. Alternative assemblies can be applied so long as they provide a rigid grip and are also flexible to allow the gripper jaw to change shape and to conform to any gripped item. Bicycle brake wire is also beneficially applied because of its ability to, when pushed and pulled, retain its original shape. As such, alternative assemblies can be applied so long as any compression in the assembly, caused in one motion of the push-pull assembly, is both reversed in the counteracting motion and does not lead to a permanent deformation of the assembly.

In specific embodiments of the invention, the push-pull assembly of the gripper will be actuated by an actuator. The actuator can include one or more linear actuators. In embodiments in which the gripper includes two separate push-pull assemblies, the two assemblies can be connected to a single linear actuator. Alternatively, each push-pull assembly can be actuated by an independent linear actuator. In embodiments in which the push-pull assembly includes a wire or other line, the actuator can be a radial actuator that rotates the wire around a reel in a pull action and unwinds the reel in a push action. Alternatively, in embodiments in which the push-pull assembly includes a stiff wire or other line, the actuator can be a linear actuator that moves along a path of the wire away from the gripper in a pull action and moves along the path of the wire towards the gripper in a push action. The required range of motion of the actuator will depend on the degree of displacement of the gripper jaws during the gripping action. However, experiments have shown that with a gripper jaw in accordance with FIG. 1 and having a length on the order of 100 mm, a single linear actuator with a range of motion of 60 mm or less is sufficient for a gripping motion from fully open to fully closed.

Figure 2:
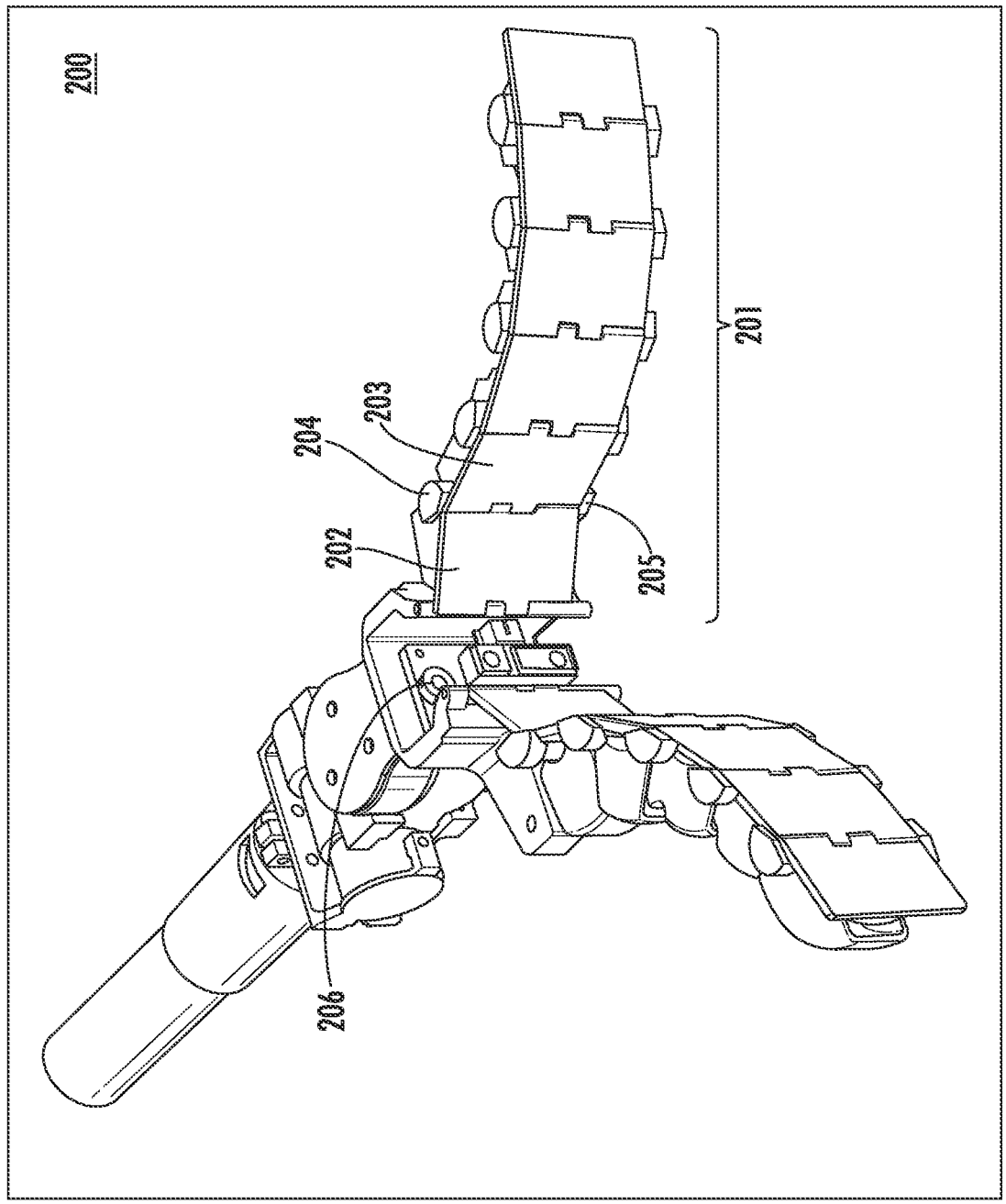
FIG. 2 includes a rendering of a gripper with two compliant gripper jaws and a set of digits on each gripper jaw shown in detail in accordance with specific embodiments of the invention.

FIG. 2 includes a rendering 200 of a gripper with two compliant gripper jaws and a set of digits on each gripper jaw shown in detail in accordance with specific embodiments of the invention. Digit 202 and digit 203 in set of digits 201 are attached via a pin threaded through the interlocking components of digit 202 and 203. The pin is held in place by caps 204 and 205 located on the top and bottom of the gripper jaw. This pin, and the others like it, allow the gripper jaw to be compliant and conform to the item to be gripped. The digits are interconnected by the pins to form a set of joints between the digits, and the digits are thereby able to swing on the set of joints formed by the set of pins. In the illustrated case, the digits are formed of three-dimensional printed plastic. Rendering 200 illustrates the gripper without a push-pull assembly and without any surface treatments or attachments on the gripping surface of the digits. However, the plastic surface of the illustrated digits can be covered by a material with the ability to generate more friction against the surface of a grip target as will be described below.

While FIG. 2 is in accordance with specific embodiments of the invention disclosed herein, various modifications can be made to the illustrated gripper in keeping with alternative embodiments. For example, the number of digits on the gripper jaw can be increased or decreased. As the length of each digit along the gripper jaw increases, the compliance of the gripper jaw decreases. However, the gripping force, all else held equal, tends to decrease with the length of each digit. Numerous factors affect the compliance and gripping force. However, for plastic or rubber digits utilized with metal wires in a push-pull assembly, a length of 10-40 mm is enough for a broad range of items to be gripped with weights on the order of less than 5 lbs. As another example, the compliance of the gripper jaw can be afforded without the use of digits and can instead by provided by having the material and structure of the gripper jaw selected so that it is a single monolithic compliant element which is moved between the open and closed state using a push-pull assembly. In these embodiments, the monolithic element could be hinged at the center point of the gripper. The transition between the open and closed state could be afforded entirely by the push-pull assembly while the compliance of the element assured conformity with the item to be gripped. In these embodiments, tension in the compliant element would be produced based on the shape of the item and not the status of the gripper as being in the opened or closed state.

Figure 3:
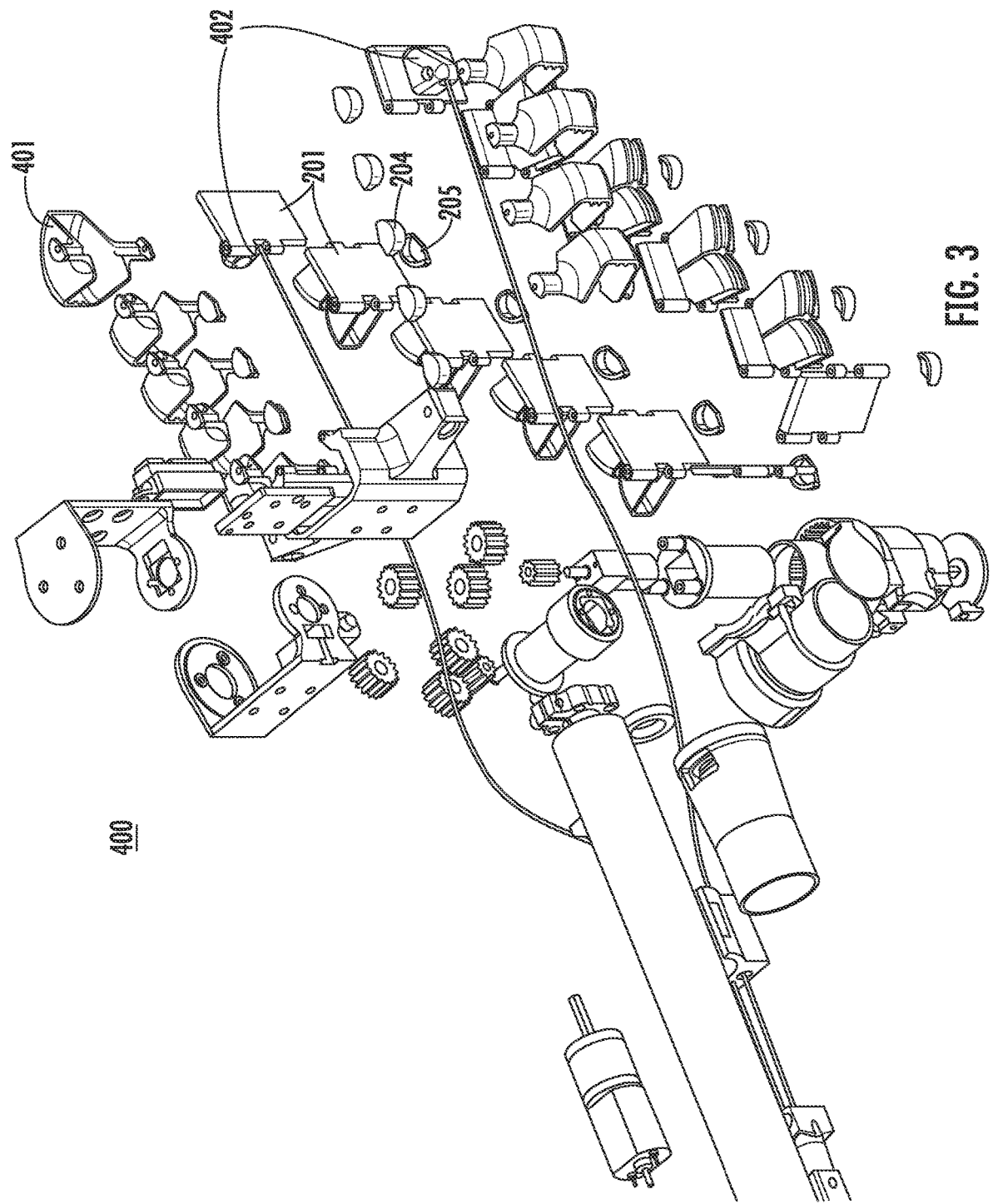
FIG. 3 includes an exploded view of a gripper in accordance with specific embodiments of the invention disclosed herein.

FIG. 3 includes exploded view 400 of a gripper design in accordance with specific embodiments of the invention disclosed herein. The exploded view illustrates the digits 201 of FIG. 2 with screw hole caps 204, 205 for the screws exploded away from the digits 201. The exploded view also show digit covers, such as digit cover 401, which are centered on the interlocking components of the digits and are attached to the sets of digits 201 by the same screws which connect adjacent digits. As illustrated, the screw hole caps 204, 205 also cover the screw holes of the digit covers. The exploded view also show how distal ends of the push-pull assemblies 402 are fixed at the terminal ends of the gripper jaws. In the illustrated case, the distal ends are fixed by being inserted into holes that are aligned with the channel through which the wires are pushed and are then fastened by being compressed under the screw heads of screws that are screwed in a direction perpendicular to said channel. In alternative embodiments, the distal ends are attached by adhesive, by fusing or welding, or by compressing the channel itself. The distal ends could also be threaded or tied around a post (e.g., the body of a screw or nail) located at the distal end of the gripper jaw.

Figure 4:
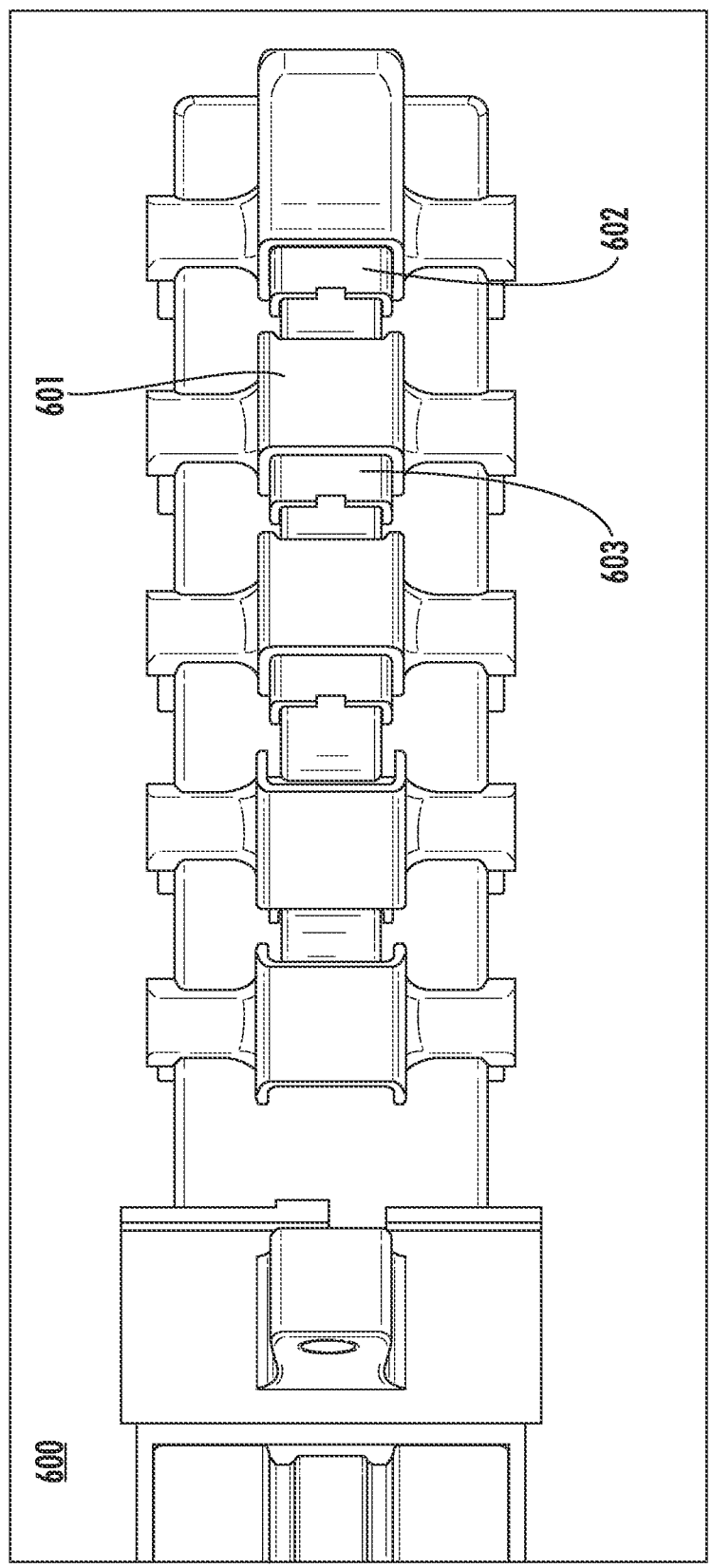
FIG. 4 includes a rendering of a back side of a gripper jaw in accordance with specific embodiments of the invention.

FIG. 4 includes a rendering 600 of a back side of a gripper jaw in accordance with specific embodiments of the invention. The back side of the gripper jaw shows the elements for the gripper jaw that conceal the channel through which a push-pull assembly could be threaded in accordance with specific embodiments of the invention. The channel is formed by interlocking vertebrae, such as 603 and 602, which are part of the digits that make up the gripper jaw. The vertebrae serve to maintain the push-pull assembly on track during actuation. As illustrated, the vertebrae are an integral portion of a monolithic digit. However, in alternative embodiments, the vertebrae could be independent pieces adhered to the digits or over-molded on the digits. FIG. 4 also illustrates covers 601 which are centered on the hinges of the digits and are attached using the same screw holes and caps which form those hinges. The covers are arranged to keep the push-pull assembly hidden between digits and serve to protect the push-pull assembly. The covers also prevent an object from getting stuck between the digits and preventing the gripper from being able to open or close. In specific embodiments, a set of covers is attached to the set of digits which shield a set of joints when the gripper closes. For example, as illustrated, vertebrae 603 and 602 are attached to adjacent digits and cover 601 is attached to both digits at the hinge between the two. Cover 601 shields the joint when the gripper closes as the interlocking portions of the vertebrae 603 and 602 would otherwise spread apart to expose the channel for the push-pull assembly.

In specific embodiments of the invention in which a gripper jaw is actuated by a push-pull assembly in the form of a wire, the wire can be threaded through a channel in the compliant gripper jaw. The channel can be formed through components of the gripper jaw. In embodiments in which the gripper jaw includes digits, the channel can be formed through the digits. The channel can also be formed through vertebrae that are attached to the digits, or that form an integral part of the digits. With reference to FIG. 4, the channel can be through a hole in the center of interlocking vertebrae, such as 603 and 602. The channel can be formed while three-dimensional printing the components of the gripper jaw or when molding the components of the gripper jaw—where the mold includes a spacer for the push-pull assembly.

In specific embodiments of the invention, the controller of the gripper will not alter the force of the grip based on the item that is to be gripped. Instead, the compliance of the gripper jaw will alter the amount of pressure applied by spreading the force across the surface of the item. For example, in specific embodiments of the invention in which a push-pull assembly is used to actuate at least one gripper jaw, the push-pull assembly can be maximally pushed and maximally pulled in each gripping action regardless of the identity of the grip target. As opposed to sensing the degree by which the gripper jaw should be actuated, the compliant nature of the gripper jaw and the push-pull action of the gripper customizes the gripping action and renders the gripper general-purpose.

Figure 5:
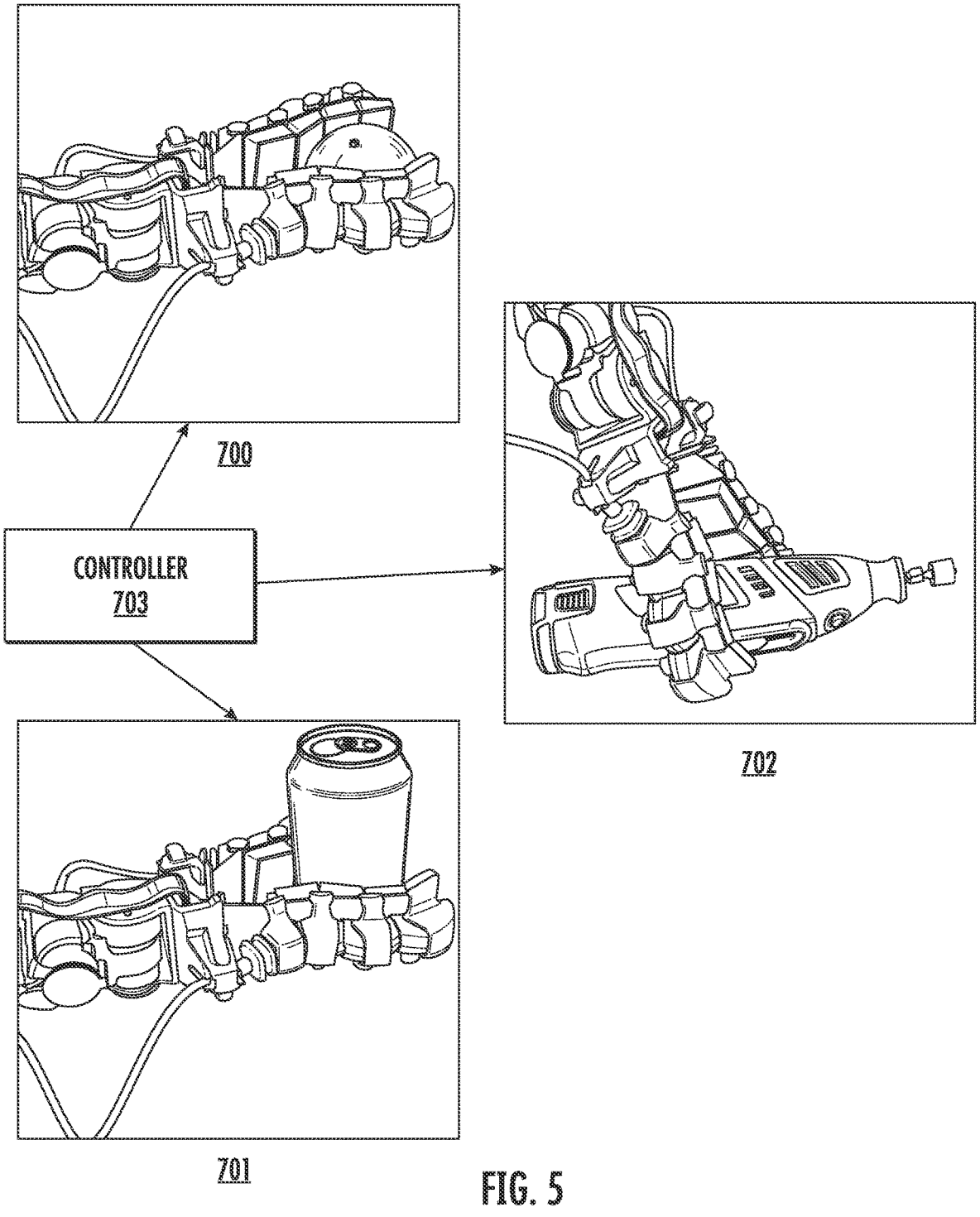
FIG. 5 includes images of a single gripper executing the same gripping action to grip three different items in accordance with specific embodiments of the invention disclosed herein.

FIG. 5 includes images of a single gripper executing the same gripping action to grip three different items in accordance with specific embodiments of the invention. Notably, the angle at which the gripper approaches the item is different, but the gripping action (i.e., the motion of the actuator that causes the gripper to move from an open state to a closed state) is the same in each case. In images 700 and 701 the gripper is shown lifting an orange and an aluminum can. Both items have relatively low structure integrity and must be gripped carefully to avoid damage. In image 702, the gripper is shown lifting a power tool. The power tool has a relatively high degree of structural integrity, but is heavy, and therefore must be gripped firmly. However, in all three cases, the same gripping action is applied. As seen, the compliant gripper jaws conform to the surface of the item, thereby distributing the pressure applied by the gripper across the item.

In all the illustrated cases of FIG. 5, the same controller 703 is used to control the gripping action. Controller 703 is programmed to send a grip command and a release command. As illustrated, the commands flow from the controller 703 to the gripper, and there is no requirement for information to flow back from the gripper to the controller 703. In other words, the same gripping action is applied, and the control loop which controls the gripping action does not require any sensor data. There is no requirement that the gripper provide data regarding the force being applied by the gripper on any surface. Instead, the grip command can cause a maximal movement of the actuator in one direction and the release command can cause a maximal movement of the actuator in the opposite direction. For example, if the gripping action were controlled by a single linear actuator connected to one or more push-pull assemblies, the grip command could cause the single linear actuator to maximally push the one or more push-pull assemblies to their maximum extent, and the release command could cause the single linear actuator to maximally pull the one or more push-pull assemblies to their maximum extent.

In specific embodiments of the invention, an entire grip routine (including positioning the gripper prior to the execution of the gripping action itself) can be guided by sensor data, while the gripping action itself is only controlled by sensor data to the extent the gripping action can be cancelled. For example, the gripper could include a depth sensor located at the center of the gripper which could be used to position the gripper relative to an object to be gripped or to detect the absence of the object from an expected location. The depth sensor data could then be used to cancel a gripping action upon determining that the object had moved from a specific location. FIG. 2 includes a depth sensor 206 located between a first gripper jaw and a second gripper jaw (at the center of the illustrated gripper). However, the illustrated gripper still does not use any sensors to execute the gripping action as the depth sensor is only used as part of the gripping routine to position the gripper and potentially cancel a gripping action if the object moves unexpectedly.

In specific embodiments of the invention, the gripping surface of the gripper will include treatments to provide enhanced friction against the grip target. As a result, the amount of pressure applied to the item can be decreased while maintaining a secure grip. This allows for the use of a smaller clamping force via reliance on the friction between the item and the friction enhancing treatments to help hold the object in place. The gripping surface can be covered by a continuous treatment. In embodiments in which the gripping surface is broken up by hinged digits, the gripping surface can be a continuous treatment that spans the hinges, or individual treatments that cover the gripping surface of each digit independently.

In specific embodiments of the invention, the gripping surface of the gripper will include treatments to increase the compliance of the gripper and decrease the pressure applied to the item. The treatments which decrease the pressure can have the same configuration as the treatments that increase friction (i.e., a continuous treatment or treatments for individual digits). In specific embodiments of the invention, both kinds of treatments will be applied with the friction enhancing treatments sandwiching the pressure reducing treatments with the main components of the gripper jaw. Both kinds of treatments can have the same or different configurations (e.g., a continuous pressure reducing treatment and a set of independent friction enhancing treatments).

Figure 6:
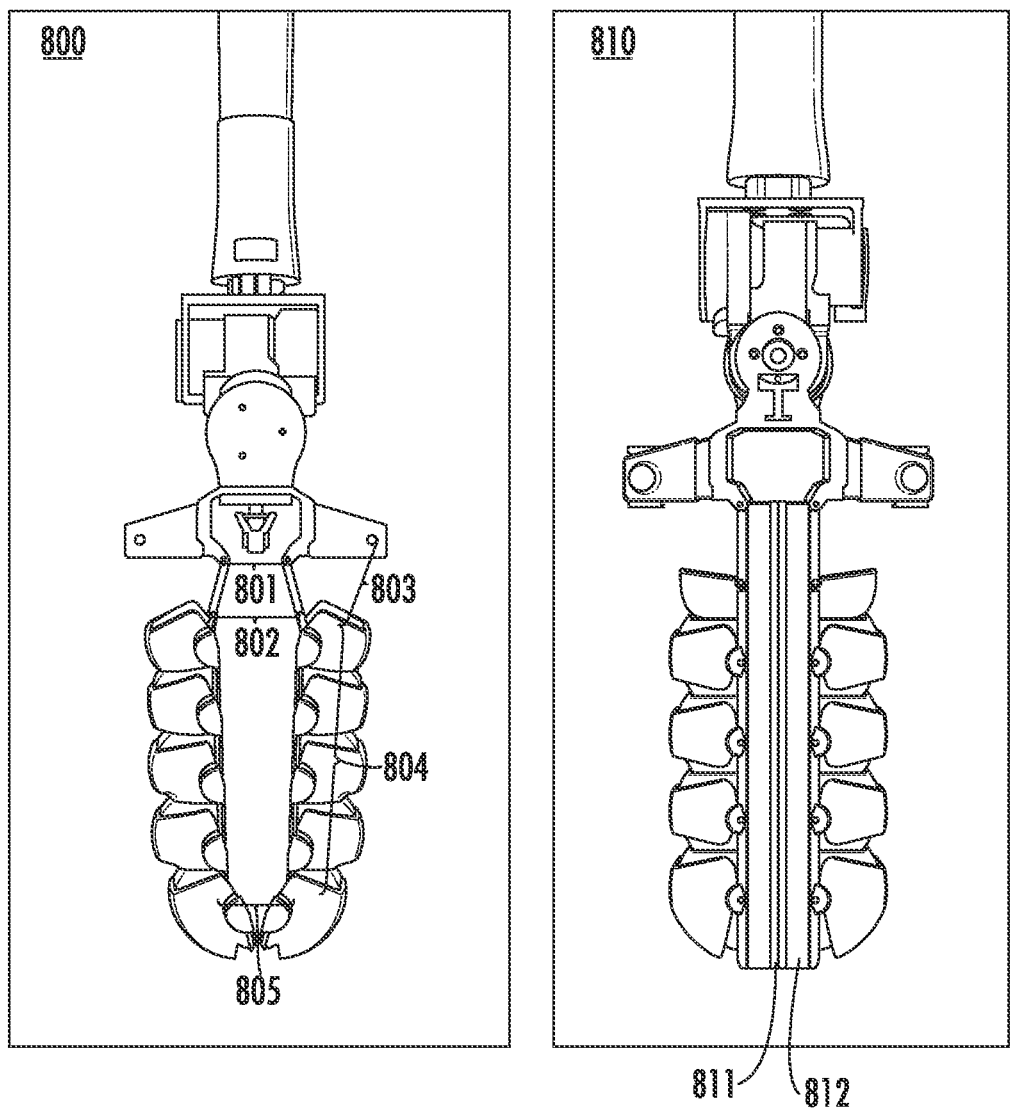
FIG. 6 includes two renderings of different gripper designs with variant grip apertures in accordance with specific embodiments of the invention disclosed herein.

In specific embodiments of the invention, the treatments can take on various forms. The pressure reducing treatments could be a compressible material such as foam, rubber, or any material with a low Shore Type A hardness, such as less than 40. The gripper jaws could include a compressible material such as a foam liner placed on the compliant gripper jaw. The foam liner could extend across the entire extent of the gripper jaw. The friction enhancing treatments could be any material with relatively high friction (e.g., a dry self-contact static friction coefficient in excess of 1). The fiction enhancing elements could be a silicon pad or pads. The gripper could also include a pad on the foam liner. The gripper could also include a friction enhancing pad on the gripper jaw. The pad could extend across the entire extent of the gripper jaw or be one of several pads located on the main components of the gripper jaw (e.g., digits if the gripper jaw included multiple digits). If the gripper had both a foam liner and a pad or pads, the pad or pads could have higher friction that the foam liner. The compliant gripper jaws could comprise plastic with silicon pads adhered to the gripping surface to increase the friction of the grip. FIG. 6 includes a rendering 810 of a gripper with a foam liner 812 adhered to the compliant gripper jaw, and a silicon pad 811 located thereon. As illustrated, the alternative gripper jaw on the same gripper has the same set of treatments.

In specific embodiments of the invention, the gripper can have different grip apertures. FIG. 6 includes two renderings of different gripper designs with variant apertures in accordance with specific embodiments of the invention disclosed herein. Render 810 shows a gripper having a zero aperture in the closed state—meaning that, as illustrated, the gripper jaws and their associated treatments are fully in contact along the entire length of the gripper jaw. Render 800 shows a gripper having a non-zero aperture in the closed state. As shown, the distal ends of the gripper are in contact, but the size of the aperture is effectively non-zero along the remainder of the gripping surface. In embodiments in which the grip aperture is non-zero, and is variant, a depth sensor in the center of the gripper, and any other associated sensing systems, can generate a gripping routine that is optimized for a specific object. The gripping routine can be optimized by balancing the amount of pressure that will be applied to the object against the required gripping force that will be needed to maintain a solid grip of the item (e.g., in the illustrated case heavy strong objects can be gripped with the distal end of the griper jaws, while lighter weaker objects are gripped closer towards the center of the gripper. The reference labels in render 800 correspond to the following dimensions: 801 is 21 mm; 802 is 40 mm; 803, which follows the path of the push-pull assembly into the first main component of the gripper jaw, is 25 mm; 804, which follows the path of the push-pull assembly from the first digit joint to the final digit joint, is 95 mm; and 805 is 35 mm.

In specific embodiments of the invention, the gripper includes a flexible tip attached to a distal end of the gripper. The flexible tip can be used to manipulate objects in the environment without gripping them. For example, the gripper jaws can be closed, and the flexible tip can be used to flick a common household light switch on or off, push down on a handle, or turn a levered faucet on and off. The flexible tip can be formed of rubber, silicon, or any other similar flexible material. In specific embodiments of the invention, the gripper can have a flexible tip.

While the specification has been described in detail with respect to specific embodiments of the invention, it will be appreciated that those skilled in the art, upon attaining an understanding of the foregoing, may readily conceive of alterations to, variations of, and equivalents to these embodiments. Although examples in the disclosure where generally directed to robotic grippers, the same approaches could be utilized to manually operated grippers such as for tools or disabled assistance. These and other modifications and variations to the present invention may be practiced by those skilled in the art, without departing from the scope of the present invention, which is more particularly set forth in the appended claims.

What is claimed is:

1. A gripper comprising:
a first compliant gripper jaw;
a first push-pull assembly having a first distal end fixed on the first compliant gripper jaw, wherein the first push-pull assembly is a first wire threaded through a first channel in the first compliant gripper jaw, wherein the first channel is formed through a first set of digits, wherein the first set of digits are interconnected by a first set of pins, and wherein the first set of digits swing on a first set of joints formed by the first set of pins;
a second compliant gripper jaw;
a second push-pull assembly having a second distal end fixed on the second compliant gripper jaw, wherein the second push-pull assembly is a second wire threaded through a second channel in the second compliant gripper jaw, wherein the second channel is formed through a second set of digits, wherein the second set of digits are interconnected by a second set of pins, and wherein the second set of digits swing on a second set of joints formed by the second set of pins;
an actuator connected to both the first push-pull assembly and the second push-pull assembly; and
a first set of covers attached to the first set of digits, wherein the first set of covers shield the first set of joints when the gripper closes; and
a second set of covers attached to the second set of digits, wherein the second set of covers shield the second set of joints when the gripper closes.

2. The gripper of claim 1, wherein the actuator further comprises:
a single linear actuator connected to both the first push-pull assembly and the second push-pull assembly.

3. The gripper of claim 1, wherein:
the first wire and the second wire are rigid metal.

4. The gripper of claim 1, further comprising:
a depth sensor located between the first compliant gripper jaw and the second compliant gripper jaw;
wherein the gripper does not use any sensors to execute a gripping action.

5. The gripper of claim 1, further comprising:
a controller programmed to send a grip command and a release command;
wherein the actuator is a single linear actuator connected to both the first push-pull assembly and the second push-pull assembly;
wherein the grip command causes the single linear actuator to maximally push the first and second push-pull assemblies to their maximum extent; and
wherein the release command causes the single linear actuator to maximally pull the first and second push-pull assemblies.

6. The gripper of claim 1, further comprising:
a foam liner on the first compliant gripper jaw; and
a pad on the foam liner, wherein the pad has a higher friction than the foam liner.

7. The gripper of claim 1, further comprising:
a first pad on the first compliant gripper jaw; and
a second pad on the second compliant gripper jaw;
wherein the first and second pads have dry self-contact static friction coefficients in excess of one.

8. The gripper of claim 7, further comprising:
the first and second compliant gripper jaws comprise plastic; and
the first and second pads comprise silicon.

9. The gripper of claim 1, further comprising:
a first set of digits forming the first compliant gripper jaw;
a second set of digits forming the second compliant gripper jaw;
a first set of pads wherein each digit in the first set of digits has a pad from the first set of pads; and
a second set of pads, wherein each digit in the second set of digits has a pad from the second set of pads;
wherein the pads in the first set of pads and the pads in the second set of pads each have dry self-contact static friction coefficients in excess of one.

10. The gripper of claim 1, further comprising:
a first set of digits forming the first compliant gripper jaw, wherein the first set of digits swing on a first set of joints interspersed with the first set of digits; and
a second set of digits forming the second compliant gripper jaw, wherein the second set of digits swing on a second set of joints interspersed with the second set of digits.

11. The gripper of claim 1, further comprising:
a flexible tip attached to a distal end of the gripper.

* * * * *